United States Patent [19]
Doniaz

[11] Patent Number: 6,053,554
[45] Date of Patent: Apr. 25, 2000

[54] MULTI-SECTION VERTICALLY RETRACTABLE AND EXTENDABLE TAIL GATE SYSTEM

[76] Inventor: Martin Doniaz, P.O. Box 1342, Ruskin, Fla. 33570

[21] Appl. No.: 09/225,087

[22] Filed: Jan. 4, 1999

[51] Int. Cl.[7] .................................................... B60P 1/267
[52] U.S. Cl. ........................................................... 296/50
[58] Field of Search ............................ 296/50, 52, 146.1, 296/98

[56] References Cited

U.S. PATENT DOCUMENTS

| | | | |
|---|---|---|---|
| 4,252,362 | 2/1981 | Campbell | 296/98 |
| 4,702,511 | 10/1987 | Olins | |
| 4,813,842 | 3/1989 | Morton | 414/557 |
| 5,104,172 | 4/1992 | Schildt | 296/50 |
| 5,271,652 | 12/1993 | Watanabe et al. | 296/36 |
| 5,277,275 | 1/1994 | Ablabutgan | 187/8.71 |
| 5,449,212 | 9/1995 | Seifert | 296/57.1 |
| 5,518,287 | 5/1996 | Totani | 296/57.1 |

*Primary Examiner*—Joseph D. Pape
*Attorney, Agent, or Firm*—Joseph N. Breaux

[57] ABSTRACT

A multi-section vertically retractable and extendable tail gate system that is installable on a pickup truck and that includes a winding shaft housing having a winding shaft rotatably mounted therein, left and right tail gate assemblies each including a guide channel formed in rigid connection with the winding shaft housing, a hingedly connected multi-section tail gate assembly having a bottom end secured to the tail gate assembly winding shaft and being of a width such that the left and right side edges, respectively, of the multi-section tail gate assembly are slidably positioned within respective left and right guide channels, and a winding shaft drive mechanism in connection with the tail gate assembly winding shaft.

3 Claims, 2 Drawing Sheets 6,053,554

MULTI-SECTION VERTICALLY RETRACTABLE AND EXTENDABLE TAIL GATE SYSTEM

TECHNICAL FIELD

The present invention relates to truck bed tail gate barriers and more particularly to a multi-section vertically retractable and extendable tail gate system that includes a winding shaft housing having a tail gate assembly winding shaft rotatably mounted therein and an elongated retraction/extension slot formed through a top surface thereof, left and right tail gate assemblies each including a guide channel formed in rigid connection with the winding shaft housing extending partially into an end of the elongated retraction/extension slot and a truck mounting structure rigidly connected to the guide channel; a hingedly connected multi-section tail gate assembly having a bottom end secured to the tail gate assembly winding shaft and being of a width such that the left and right side edges, respectively, of the multi-section tail gate assembly are slidably positioned within the respective left and right guide channels as the multi-section tail gate assembly is extended and retracted through the elongated retraction/extension slot and of a length such that the multi-section tail gate assembly is fully windable onto the tail gate assembly winding shaft; and a winding shaft drive mechanism in connection with the tail gate assembly winding shaft; each truck mounting structure extending from a respective U-shaped channel and positionable against an interior sidewall of a truck bed sidewall and securable thereto.

BACKGROUND ART

Many pickup truck users could benefit from removing the conventional pivoting tailgate of a pickup truck and replacing it with a vertically retractable and extendable multi-section tail gate assembly.

GENERAL SUMMARY DISCUSSION OF INVENTION

It is thus an object of the invention to provide a multi-section vertically retractable and extendable tail gate system that is installable on a pickup truck.

It is a further object of the invention to provide a multi-section vertically retractable and extendable tail gate system that includes a winding shaft housing having a tail gate assembly winding shaft rotatably mounted therein and an elongated retraction/extension slot formed through a top surface thereof, left and right tail gate assemblies each including a guide channel formed in rigid connection with the winding shaft housing extending partially into an end of the elongated retraction/extension slot and a truck mounting structure rigidly connected to the guide channel; a hingedly connected multi-section tail gate assembly having a bottom end secured to the tail gate assembly winding shaft and being of a width such that the left and right side edges, respectively, of the multi-section tail gate assembly are slidably positioned within the respective left and right guide channels as the multi-section tail gate assembly is extended and retracted through the elongated retraction/extension slot and of a length such that the multi-section tail gate assembly is fully windable onto the tail gate assembly winding shaft; and a winding shaft drive mechanism in connection with the tail gate assembly winding shaft; each truck mounting structure extending from a respective U-shaped channel and positionable against an interior sidewall of a truck bed sidewall and securable thereto.

It is a still further object of the invention to provide a multi-section vertically retractable and extendable tail gate system that accomplishes both of the above objects in combination.

Accordingly, a multi-section vertically retractable and extendable tail gate system is provided. The multi-section vertically retractable and extendable tail gate system includes a winding shaft housing having a tail gate assembly winding shaft rotatably mounted therein and an elongated retraction/extension slot formed through a top surface thereof, left and right tail gate assemblies each including a guide channel formed in rigid connection with the winding shaft housing extending partially into an end of the elongated retraction/extension slot and a truck mounting structure rigidly connected to the guide channel; a hingedly connected multi-section tail gate assembly having a bottom end secured to the tail gate assembly winding shaft and being of a width such that the left and right side edges, respectively, of the multi-section tail gate assembly are slidably positioned within the respective left and right guide channels as the multi-section tail gate assembly is extended and retracted through the elongated retraction/extension slot and of a length such that the multi-section tail gate assembly is fully windable onto the tail gate assembly winding shaft; and a winding shaft drive mechanism in connection with the tail gate assembly winding shaft; each truck mounting structure extending from a respective U-shaped channel and positionable against an interior sidewall of a truck bed sidewall and securable thereto.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
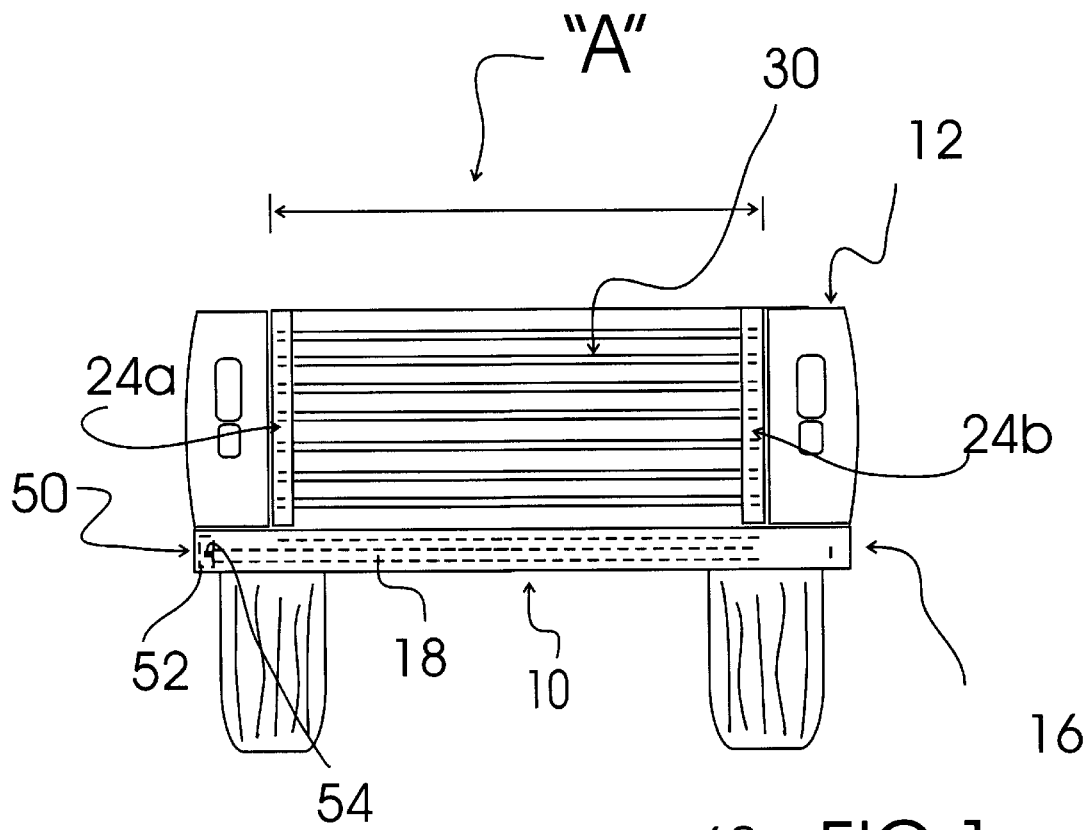
FIG. 1 is a rear end view of an exemplary embodiment of the multi-section vertically retractable and extendable tail gate system of the present invention showing the hingedly connected multi-section tail gate assembly in the fully extended position; the tail gate assembly winding shaft; the winding shaft drive mechanism, in this case a bi-directional electric drive motor; the winding shaft housing; and the left and right tail gate assembly guide channels and truck mounting structures, the left and right tail gate assembly guide channels being formed in rigid connection with the winding shaft housing.

FIG. 1 shows an exemplary embodiment of the multi-section vertically retractable and extendable tail gate system of the present invention, generally designated 10, installed in connection with the rear opening of a pickup truck bed, generally designated 12. Tail gate system 10 includes a winding shaft housing, generally designated 16; a tail gate assembly winding shaft, shown in dashed lines and generally designated 18 (shown more clearly in FIG. 4) rotatably mounted therein and an elongated retraction/extension slot, generally designated 20 (FIG. 3), formed through a top surface 22 thereof; left and right tail gate assemblies, generally designated 24a,24b each including a guide channel 26a,26b (FIG. 3) formed in rigid connection with the winding shaft housing 16 (FIG. 3) and each extending partially into an end of elongated retraction/extension slot 20 (FIG. 3) and a truck mounting structure 28a,28b that is rigidly connected to a respective guide channel 26a,26b; a hingedly connected multi-section tail gate assembly, generally designated 30, having, referring now to FIG. 4, a bottom end 32 secured to tail gate assembly winding shaft 18 and, referring back to FIG. 1, being of a width "A" such that, referring back to FIG. 3) left and right side edges 30a,30b of multi-section tail gate assembly 30 are slidably positioned within the respective left and right guide channels 26a,26b as the multi-section tail gate assembly is extended and retracted through elongated retraction/extension slot 20. Multi section tailgate assembly 30 is of a length such that the multi-section tail gate assembly 30 is fully windable onto tail gate assembly winding shaft 18 (FIG. 1) and completely into winding shaft housing 16 (FIG. 1). With reference back to FIG. 1, the force to drive tail gate winding shaft 18 is provided by a winding shaft drive mechanism, generally designated 50, including a bi-directional electric drive motor 52 having a drive shaft 54 coupled to tail gate winding shaft 18. Bi-directional electric drive motor 52 is control ed by a control switch that can be mounted in the cab of the pickup if desired.

Figure 2:
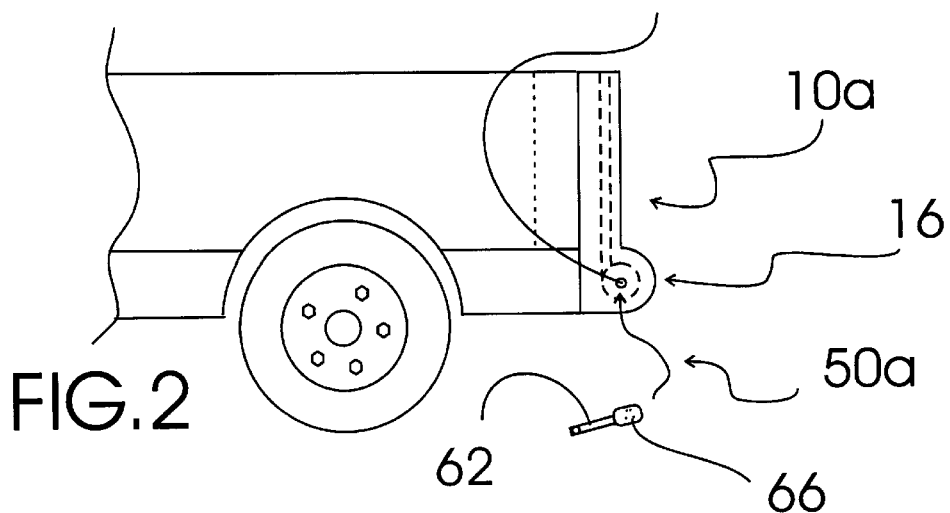
FIG. 2 is a side plan view a second exemplary embodiment of the multi-section vertically retractable and extendable tail gate system that is identical to the embodiment of FIG. 1 except in this embodiment the tail gate assembly winding shaft drive mechanism includes a hand crank attachment fitting and a hand crank detachably securable to the hand crank attachment fitting.
Figure 3:
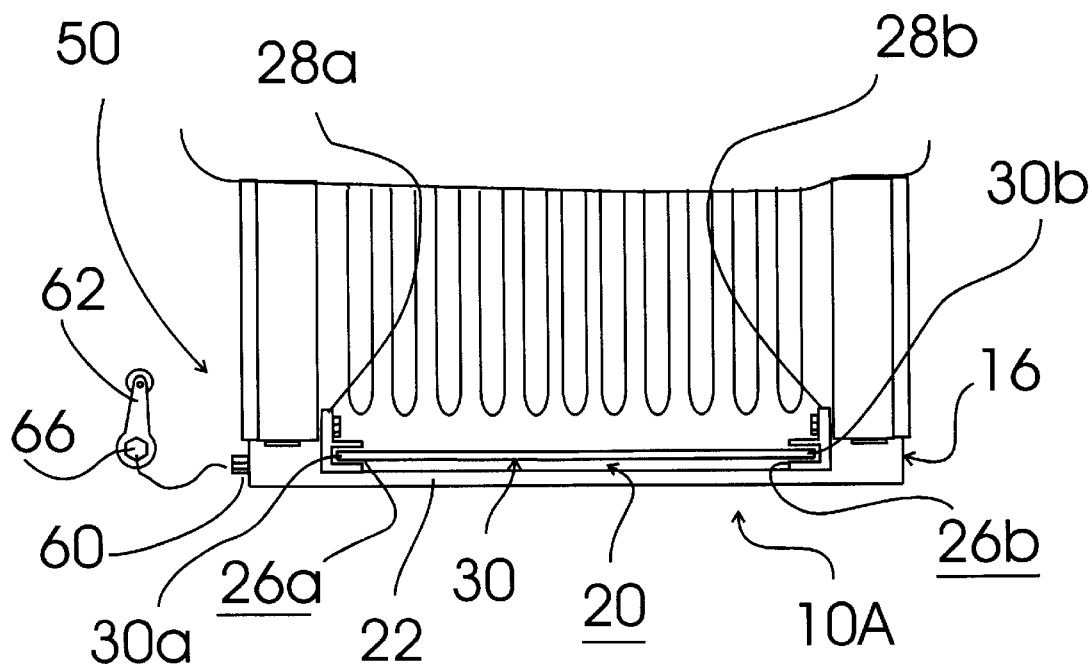
FIG. 3 is a top plan view of the second exemplary embodiment of the multi-section vertically retractable and extendable tail gate system of FIG. 2 showing the hingedly connected multi-section tail gate assembly; the winding shaft housing with the retraction and extension opening of the winding shaft housing positioned with respect to the left and right guide channels such that the left and right side edges, respectively, of the tail gate assembly are directed into the respective left and right guide channel; the hand crank attachment fitting extending out past the left side of the winding shaft housing; the hand crank detachably securable to the hand crank attachment fitting; and the left and right tail gate assembly guide channels each including a U-shaped guide channel surrounding, respectively, the left and right side edges of the hingedly connected multi-section tail gate assembly and a truck mounting structure extending from the U-shaped channel and bolted to the interior truck bed walls with bolts.
Figure 4:
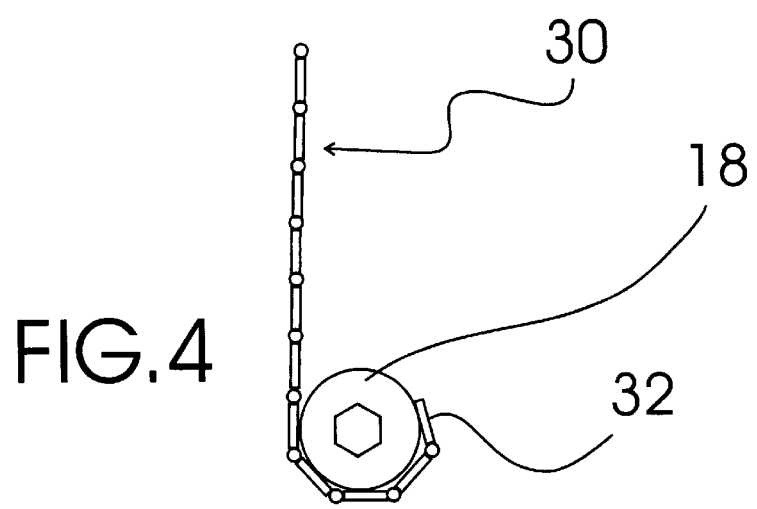
FIG. 4 is a detail side plan view of the hingedly connected multi-section tail gate assembly and tail gate assembly winding shaft insolation showing a portion of the tail gate assembly extended from the winding shaft; a portion of the tail gate assembly wrapped around and attached to the winding shaft, and the hexagonal hand crank attachment fitting extending out from the end of the winding shaft.

FIG. 2 and 3 show a second embodiment of multi-section vertically retractable and extendable tail gate system, generally designated 10a, that is identical in all respects to multi-section vertically retractable and extendable tail gate system 10 (FIG. 1) except winding shaft drive mechanism, generally designated 50a, includes a hexagonal hand crank attachment fitting 60 extending out past the left side of winding shaft housing 16 and a hand crank 62 having a socket 66 keyed to be detachably securable to hexagonal hand crank attachment fitting 60.

It can be seen from the preceding description that a multi-section vertically retractable and extendable tail gate system has been provided that is installable on a pickup truck and that includes a winding shaft: housing having a tail gate assembly winding shaft rotatably mounted therein and an elongated retraction/extension slot formed through a top surface thereof, left and right tail gate assemblies each including a guide channel formed in rigid connection with the winding shaft housing extending partially into an end of the elongated retraction/extension slot and a truck mounting structure rigidly connected to the guide channel; a hingedly connected multi-section tail gate assembly having a bottom end secured to the tail gate assembly winding shaft and being of a width such that the left and right side edges, respectively, of the multi-section tail gate assembly are slidably positioned within the respective left and right guide channels as the multi-section tail gate assembly is extended and retracted through the elongated retraction/extension slot and of a length such that the multi-section tail gate assembly is fully windable onto the tail gate assembly winding shaft; and a winding shaft drive mechanism in connection with the tail gate assembly winding shaft; each truck mounting structure extending from a respective U-shaped channel and positionable against an interior sidewall of a truck bed sidewall and securable thereto.

It is noted that the embodiment of the multi-section vertically retractable and extendable tail gate system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A multi-section vertically retractable and extendable tail gate system comprising:

a winding shaft housing having a tail gate assembly winding shaft rotatably mounted therein and an elongated retraction and extension slot formed through a top surface thereof;

left and right tail gate assemblies each including a guide channel formed in rigid connection with said winding shaft housing extending partially into an end of said elongated retraction and extension slot and a truck mounting structure rigidly connected to said guide channel;

a hingedly connected multi-section tail gate assembly having a bottom end secured to said tail gate assembly winding shaft and being of a width such that said left and right side edges, respectively, of said multi-section tail gate assembly are slidably positioned within said respective left and right guide channels as said multi-section tail gate assembly is extended and retracted through said elongated retraction and extension slot and of a length such that said multi-section tail gate assembly is fully windable onto said tail gate assembly winding shaft; and a winding shaft drive mechanism in connection with said tail gate assembly winding shaft;

each of said truck mounting structures extending from a respective one of said guide channel and positionable against an interior sidewall of a truck bed sidewall and securable thereto.

2. The multi-section vertically retractable and extendable tail gate system of claim 1 wherein:

said winding shaft drive mechanism includes a hand crank attachment fitting formed on an end of said tail gate assembly winding shaft and a hand crank detachably securable to the hand crank attachment fitting.

3. A multi-section vertically retractable and extendable tail gate system of claim 1 wherein:

said winding shaft drive mechanism includes a bi-directional electric drive motor having a drive shaft coupled to one end of said tail gate assembly winding shaft.

* * * * *